S. Q. HAYES.
DISCONNECTING SWITCH FOR HIGH POTENTIAL CIRCUITS.
APPLICATION FILED NOV. 8, 1909.

975,422.

Patented Nov. 15, 1910.

UNITED STATES PATENT OFFICE.

STEPHEN Q. HAYES, OF PITTSBURG, PENNSYLVANIA, ASSIGNOR TO WESTINGHOUSE ELECTRIC AND MANUFACTURING COMPANY, A CORPORATION OF PENNSYLVANIA.

DISCONNECTING-SWITCH FOR HIGH-POTENTIAL CIRCUITS.

975,422.  Specification of Letters Patent.  Patented Nov. 15, 1910.

Application filed November 8, 1909. Serial No. 526,821.

*To all whom it may concern:*

Be it known that I, STEPHEN Q. HAYES, a citizen of the United States, and a resident of Pittsburg, in the county of Allegheny and State of Pennsylvania, have invented a new and useful Improvement in Disconnecting-Switches for High - Potential Circuits, of which the following is a specification.

My invention relates to very high voltage distributing systems, and it has for its object to provide a disconnecting switch which shall be relatively simple and inexpensive in construction and adapted for very high voltage service.

Line insulators of the suspension type have been produced which are capable of withstanding such high-voltage strains that voltages which were formerly considered impracticable for commercial service are now extensively employed for long distance transmission circuits.

One of the principal difficulties which is encountered in the use of very high voltages is that of providing suitable disconnecting switches which are capable of opening the circuits at the distributing points. Oil circuit breakers are provided for initially interrupting the circuits in order that the electric arcs produced may be quenched and, since these breakers are very expensive, it is particularly desirable to provide a disconnecting switch which shall be very simple and durable in construction and which shall be located in the circuit near the transmission line. It is also desirable that the circuit position of the disconnecting switch, *i. e.* whether it is open or closed, shall be apparent to any one in the station where it is located, in order to minimize the possibility of a repair workman accidentally coming in contact with a live circuit conductor.

According to my present invention, I provide a switch, of the class indicated above, which is adapted for use with very high-voltage circuits and, at the same time, accomplishing the aforesaid objective results.

Figure 1:
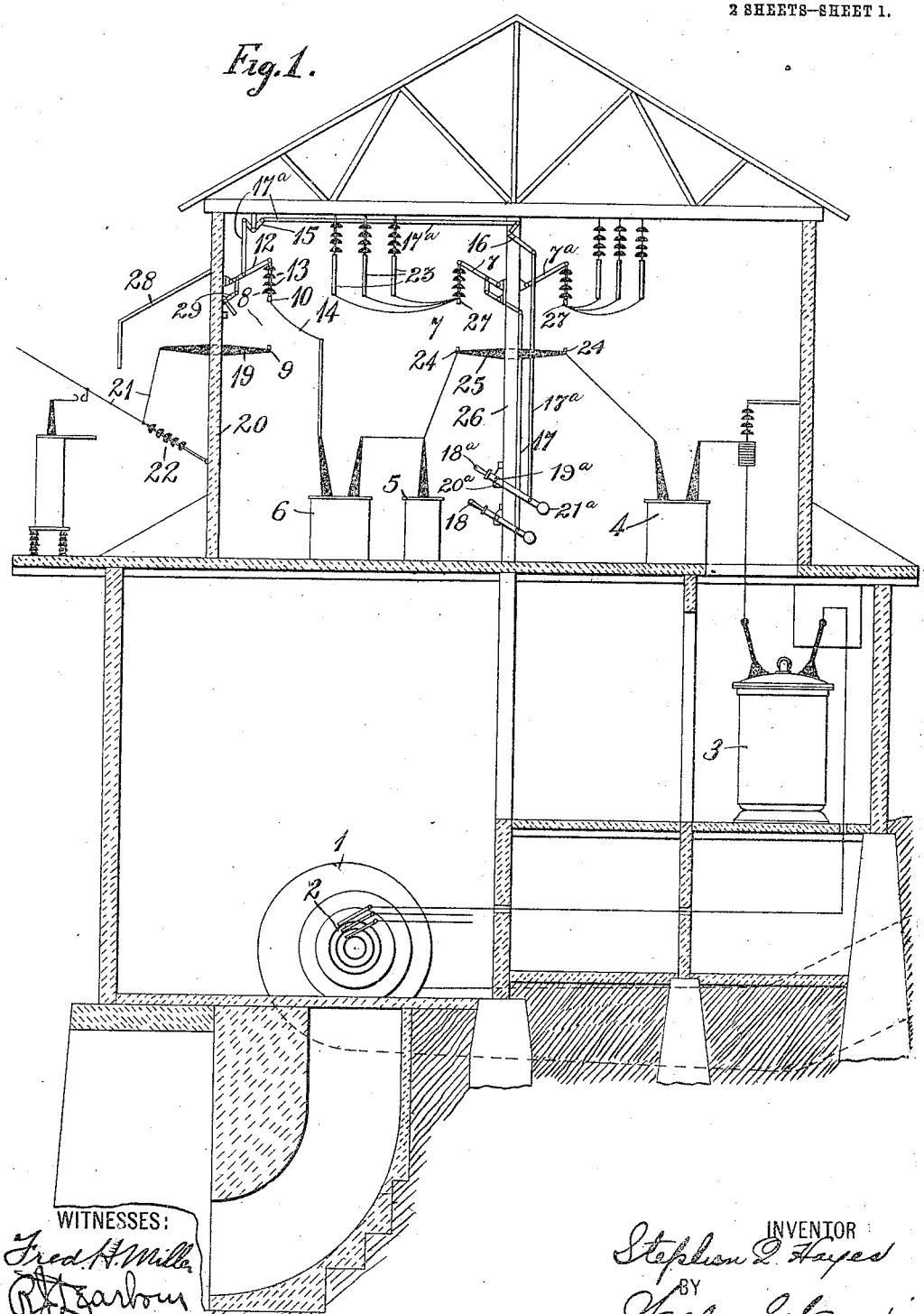
Figure 2:
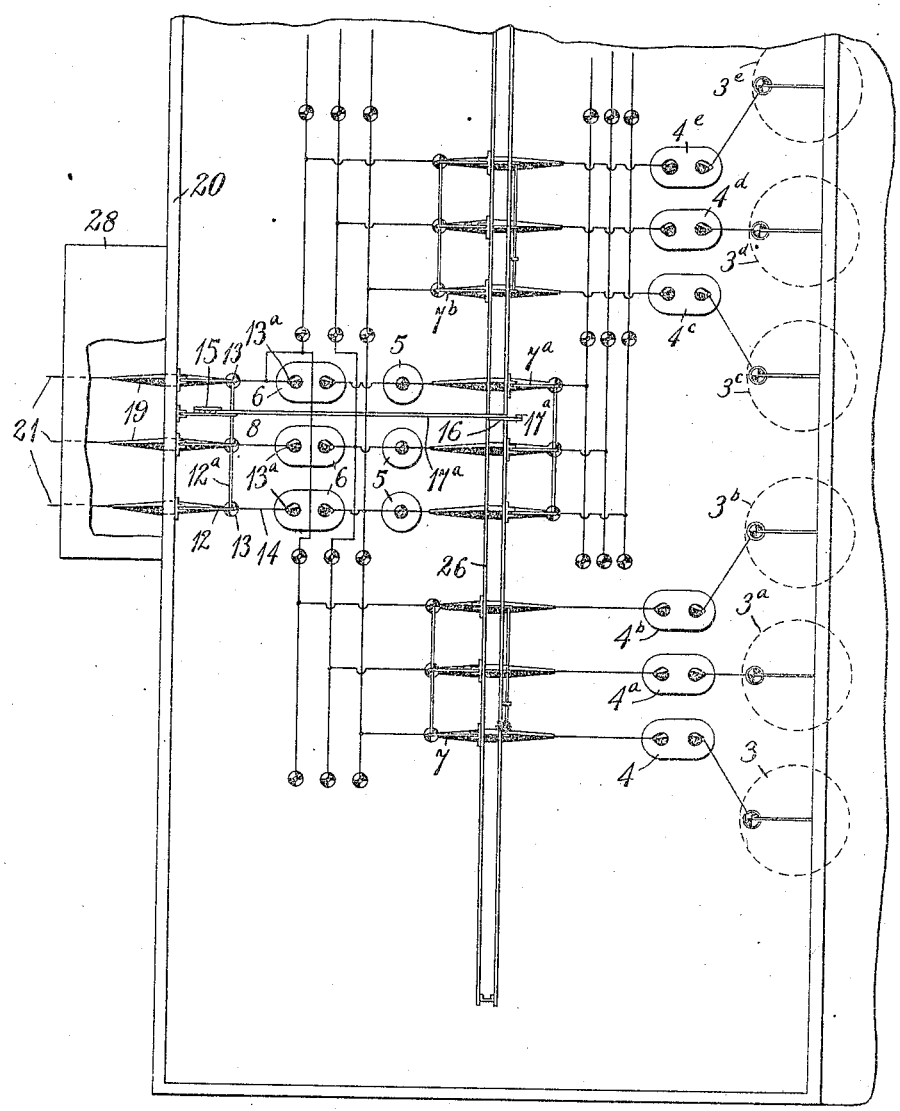

Figure 1 of the accompanying drawing is a diagrammatic elevation of a generating and transforming station which is equipped with disconnecting switches constructed in accordance with my invention. Fig. 2 is a diagrammatic plan view of the matter shown in Fig. 1.

Referring to the drawings, the structure here shown comprises a turbine or other prime mover 1 by which a generator 2 is driven, and a battery of transformers, 3, $3^a$, etc., circuit breakers 4, $4^a$, etc., series transformers 5, circuit breakers 6 and disconnecting switches 7, $7^a$, $7^b$, and 8.

If the generator 2 is a three phase generator, three single phase transformers 3, $3^a$ and $3^b$ as shown in Fig. 2, or one three phase transformer will be employed, the number of poles for each disconnecting switch and the number of series transformers being determined by the number of conductors of which the transmission circuits are composed. The series transformers and the circuit breakers form no part of my present invention and may be constructed in any suitable manner.

The disconnecting switch 8 comprises stationary contact terminals 9, movable contact terminals 10 which are suspended from the outer end of arms 12 and are insulated therefrom by series of link connected insulators 13, forming a well known "suspension" insulator. The contact terminals 10 are respectively connected to terminals $13^a$ of the circuit breakers 6 by flexible conductors 14, and the arms 12 are connected by a cross bar $12^a$ and are actuated by any suitable means, such as bell crank levers 15 and 16, links $17^a$ and an operating handle $18^a$ to which one of the links $17^a$ is connected. The handle lever is pivoted at $19^a$ on a bracket $20^a$ and is provided with a weight $21^a$ at its outer end near the point of connection with the link $17^a$, the arrangement of parts being such that a downward movement of the handle closes the disconnecting switch, and an upward movement of the same opens the switch. The stationary contact terminals 9 are connected to external circuit conductors 21 which are anchored to the wall 20 by means of strain insulators 22 and extend through long insulating bushings 19 which are mounted horizontally in the wall 20 of the power station. As above indicated, the contact terminals 10 are effectively insulated from their supports and are located directly above the contact terminals 9 so that when the arms 12 are actuated by the handle lever $18^a$, the two contact terminals come into engagement with each other or are separated from each other.

The switches 7 and $7^b$, respectively, make and break connection between bus bars 23 and the groups of transformers 3, 3ª and 3ᵇ, and 3ᶜ, 3ᵈ and 3ᵉ, the switch 7ª being interposed between bus bars 23 and 23ª. Each of the switches is similar to the switch 8, the corresponding stationary contact terminals 24 being mounted upon bushings 25 that are supported by and extend horizontally through a partition 26 of the station and electrically connected to the circuit conductors as shown in Fig. 2. The movable contact terminals 27 are supported, insulated and operated in substantially the same manner as the terminals 10.

Very high-voltage disconnecting switches, as heretofore constructed, have been manually operated by means of a hook at the end of a long pole and, consequently, could not readily be opened or closed in groups. Moreover, the attendant, in manipulating these switches, was in danger of injury, since the actuating pole alone was depended upon for insulation.

As contrasted with switches of the class just referred to, my disconnecting switch is well adapted for polyphase distributing circuits, a single opening lever being employed for concurrently operating any number of switch arms, and all of the operating mechanism parts being easily grounded. The operating mechanism also lends itself readily to the manipulation of auxiliary switches (such as switch 29, Fig. 1) for governing a signal system or switchboard indicator (not shown), as is usual with circuit breakers, to keep the station attendant informed as to the circuit position of each disconnecting switch.

It will be observed that the construction of the disconnecting switches is such that the most improved forms of high-voltage insulators are adaptable thereto, high-tension bushings of the so-called "condenser" type and "suspension" type line insulators, having a plurality of units, as shown in the drawings, being employed.

The strain insulator 22 and the outer end of the bushing 19 are preferably protected from the weather by means of a shed 28.

It is evident that the arrangement of the apparatus in the station and the structural details of the disconnecting switch may be changed without departing from the spirit of my invention and I desire that only such limitations shall be imposed as are indicated in the appended claims.

I claim as my invention:

1. A disconnecting switch comprising a horizontally disposed insulating bushing having a contact terminal at one end, a lever pivotally supported above the bushing and a movable contact terminal freely suspended from the outer end of the lever, insulated therefrom and adapted to move vertically into and out of engagement with the stationary contact terminal.

2. A disconnecting switch comprising a horizontally disposed insulating bushing extending through a vertical wall or plate and supported thereby near its middle point, a stationary contact terminal secured to one end of the bushing, a line conductor extending through the bushing and connected to the contact terminal, a lever hinge-connected to the vertical wall or plate above the bushing, a movable contact terminal freely suspended from the outer end of the lever directly above the stationary contact terminal and adapted to move vertically into and out of engagement therewith, said movable contact terminal being electrically separated from the end of the arm by means of a suspension insulator.

3. A disconnecting switch comprising a stationary contact member, a lever pivotally supported above said member, a coöperating movable contact terminal freely suspended from the outer end of the lever and an interposed insulating structure comprising a series of insulators one above another, connected by link connections.

In testimony whereof, I have hereunto subscribed my name this 27th day of October, 1909.

STEPHEN Q. HAYES.

Witnesses:
T. DAVIS,
B. B. HINES.